(12) United States Patent
Xiong et al.

(10) Patent No.: US 11,230,001 B2
(45) Date of Patent: Jan. 25, 2022

(54) BIPED ROBOT GAIT CONTROL METHOD AND BIPED ROBOT

(71) Applicant: UBTECH ROBOTICS CORP LTD, Shenzhen (CN)

(72) Inventors: Youjun Xiong, Shenzhen (CN); Ligang Ge, Shenzhen (CN); Yizhang Liu, Shenzhen (CN); Chunyu Chen, Shenzhen (CN); Zheng Xie, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 385 days.

(21) Appl. No.: 16/572,637

(22) Filed: Sep. 17, 2019

(65) Prior Publication Data

US 2020/0206898 A1  Jul. 2, 2020

Related U.S. Application Data

(63) Continuation of application No. PCT/CN2018/125103, filed on Dec. 28, 2018.

(51) Int. Cl.
 *B25J 9/00* (2006.01)
 *B25J 13/08* (2006.01)
 (Continued)

(52) U.S. Cl.
 CPC ........... *B25J 9/0006* (2013.01); *B25J 9/1607* (2013.01); *B25J 9/1615* (2013.01); *B25J 13/085* (2013.01);
 (Continued)

(58) Field of Classification Search
 CPC ...... B25J 9/0006; B25J 9/1607; B25J 9/1615; B25J 13/085; B25J 9/1641; B62D 57/032; G05D 2201/0217
 (Continued)

(56) References Cited

U.S. PATENT DOCUMENTS 5,432,417 A    7/1995 Takenaka et al.
5,936,367 A *  8/1999 Takenaka ............... B62D 57/02
                                                318/568.12
(Continued)

FOREIGN PATENT DOCUMENTS

CN    103976739 A  *  8/2014
CN    106607910 B  *  3/2019
(Continued)

OTHER PUBLICATIONS

CN 103976739.translate (Year: 2014).*
(Continued)

*Primary Examiner* — B M M Hannan

(57) ABSTRACT

There are a biped robot gait control method and a biped robot, where the method includes: obtaining six-dimensional force information, and determining a motion state of two legs of the biped robot; calculating a ZMP position of each of two legs of the biped robot; determining a ZMP expected value of each of the two legs in real time; obtaining a compensation angle of an ankle joint of each of the two legs of the biped robot by inputting the ZMP position, a change rate of the ZMP position, the ZMP expected value, and a change rate of the ZMP expected value to an ankle joint smoothing controller so as to perform a close-loop ZMP tracking control on each of the two legs; adjusting a current angle of the ankle joint of each of the two legs of the biped robot in real time; and repeating the forgoing steps.

20 Claims, 5 Drawing Sheets

(51) Int. Cl.
 *B25J 9/16* (2006.01)
 *B62D 57/032* (2006.01)
(52) U.S. Cl.
 CPC ........... *B25J 9/1641* (2013.01); *B62D 57/032* (2013.01); *G05D 2201/0217* (2013.01)
(58) Field of Classification Search
 USPC ........................................................ 700/245
 See application file for complete search history.

(56) References Cited

U.S. PATENT DOCUMENTS

| | | | | |
|---|---|---|---|---|
| 6,301,524 | B1 * | 10/2001 | Takenaka | B62D 57/02 318/568.12 |
| 8,306,657 | B2 * | 11/2012 | Yoshiike | G06N 3/008 700/246 |
| 10,836,040 | B2 * | 11/2020 | Kamioka | B25J 11/0035 |
| 2005/0110448 | A1 * | 5/2005 | Takenaka | B62D 57/032 318/568.12 |
| 2006/0059975 | A1 * | 3/2006 | Kawaguchi | G01L 25/00 73/1.15 |
| 2007/0016329 | A1 * | 1/2007 | Herr | A61F 2/70 700/250 |
| 2008/0065269 | A1 * | 3/2008 | Hasegawa | B62D 57/032 700/260 |
| 2009/0312867 | A1 * | 12/2009 | Hasegawa | B62D 57/032 700/245 |
| 2011/0022232 | A1 * | 1/2011 | Yoshiike | B62D 57/032 700/260 |
| 2011/0098856 | A1 * | 4/2011 | Yoshiike | B62D 57/032 700/246 |
| 2011/0098857 | A1 * | 4/2011 | Yoshiike | B62D 57/032 700/246 |
| 2011/0098860 | A1 * | 4/2011 | Yoshiike | B62D 57/032 700/260 |
| 2011/0178636 | A1 * | 7/2011 | Kwon | B62D 57/032 700/253 |
| 2011/0231050 | A1 * | 9/2011 | Goulding | B62D 57/032 701/26 |
| 2011/0264264 | A1 * | 10/2011 | Shirakura | B25J 19/0008 700/245 |
| 2011/0301756 | A1 * | 12/2011 | Yoshiike | B62D 57/032 700/253 |
| 2012/0065778 | A1 * | 3/2012 | Lim | B62D 57/032 700/254 |
| 2012/0083922 | A1 * | 4/2012 | Kwak | B62D 57/032 700/245 |
| 2013/0144441 | A1 * | 6/2013 | Kanazawa | B62D 57/032 700/263 |
| 2016/0089786 | A1 * | 3/2016 | Kamioka | B25J 9/1633 700/260 |
| 2021/0354299 | A1 * | 11/2021 | Xiong | G01B 21/04 |

FOREIGN PATENT DOCUMENTS

| | | | | |
|---|---|---|---|---|
| EP | 2177324 | A1 * | 4/2010 | ........... B62D 57/032 |
| JP | 4483254 | B2 * | 6/2010 | |
| JP | 5071140 | B2 * | 11/2012 | |
| KR | 20100001567 | A * | 1/2010 | ................ B25J 5/00 |
| KR | 101549817 | B1 * | 9/2015 | ........... B62D 57/032 |

OTHER PUBLICATIONS

JP5071140B2.translate (Year: 2012).*
JP2009190122A.translate (Year: 2009).*
ISR for PCT/CN2018/125103.
Written opinions of ISA for PCT/CN2018/125103.

* cited by examiner

BIPED ROBOT GAIT CONTROL METHOD AND BIPED ROBOT

BACKGROUND

1. Technical Field

The present disclosure relates to biped robot gait control technology, and particularly to a biped robot gait control method and a biped robot.

2. Description of Related Art

With the advancement of science and technology, biped robots have developed rapidly and are widely used in many fields. Currently, since most buildings and tools are designed according to the height and shape of human, the biped robots as a kind of robot platform have better flexibility. At the same time, the stability control of the gait of a biped robot is the premise and basis for the smooth walking of the robot. The gait refers to a relationship between the time and space of joints during standing or walking, which can be described through the motion trajectory of the joints.

The existing researches for the stability of the gait of biped robots are based on the methods of zero moment point (ZMP), which establish the mathematical model of a biped robot and derive the control law in accordance with the assumption that the ZMP has to be within a stable area such as the range of the leg of the robot.

The rules of the walking control of the biped robot are realized by gait planning, and most of them are in the form of open-loop. They usually plans the point trajectories of the centroid and the leg based on inverted pendulum models, obtain the angle of each joint of the robot through inverse kinematics solutions, and track the trajectories by using the proportion integral differential (PID) algorithm through a motor driver, thereby realizing a complete walking process. However, if the biped robot has an error in the posture of the body of the robot during a working process which caused by, for example, the interference of external forces or moving on an uneven ground, a deviation in the posture of the body of the robot will caused. However, since the existing biped robot generally does not include a processing algorithm for posture control, the posture of the body of the robot will gradually diverge when the interference occurs, which resulting in the failure in walking, and even causes the falling down of the biped robot.

Therefore, the existing biped robot gait control technology needs to be improved and developed.

SUMMARY

For the forgoing technical problems, the present disclosure provides biped robot gait control method which controls the ZMP real time to realize the posture control of the body and the step smoothing to ensure the stability of the walking when the body of the robot is subjected to interference and deviated, impacted by an external force, or on an uneven ground. The biped robot gait control method and a biped robot modify the expected ZMP of the leg in real time, control the posture through ZMP tracking control, and smooth the ankle joint when walking, thereby ensuring the stability of walking.

In a first aspect, a technical solution provided by the embodiments of the present disclosure is to provide a gait control method for a biped robot including the following steps:

obtaining six-dimensional force information, and determining a motion state of two legs of the biped robot based on the six-dimensional force information, where the motion state comprises a single-leg supporting state, a single-leg swing state, and a two legs supporting state;

calculating a zero moment point (ZMP) position of each of the two legs of the biped robot based on the six-dimensional force information;

determining a ZMP expected value of each of the two legs in real time based on the motion state and body posture data of the biped robot;

obtaining a compensation angle of an ankle joint of each of the two legs of the biped robot by inputting the ZMP position, a change rate of the ZMP position, the ZMP expected value, and a change rate of the ZMP expected value to an ankle joint smoothing controller so as to perform a close-loop ZMP tracking control on each of the two legs;

adjusting a current angle of the ankle joint of each of the two legs of the biped robot in real time according to the compensation angle of the ankle joint; and repeating, the forgoing steps at a preset frequency until a posture control and an ankle joint smoothing is performed in different motion states.

In the gait control method for a biped robot includes: obtaining body posture data of the biped robot detected through art inertial detecting unit and calculating the ZMP expected value based on the body posture data in real time in response to determining the motion state of the biped robot being a single-leg supporting state; and determining the compensation angle of the ankle joint of each of the two legs of the biped robot based on the ZMP position, the change rate of the ZMP position, the ZMP expected value, and the change rate of the ZMP expected value.

In the gait control method for a biped robot, the step of tracking and adjusting the current angle of the ankle joint of each of the two legs of the biped robot further includes:

converting a deviation of the ZMP position (i.e., the deviation of the actual ZMP position from the expected ZMP position) and a deviation of the change rate of the ZMP position into a virtual moment of rotating the ankle joint;

obtaining the compensation angle of the ankle joint based on the virtual moment and a rigid body rotation law; and accumulating the compensation angle of the ankle joint to the angle of the ankle joint of each of the two legs of the biped robot in a current posture so as to control a posture of the biped robot in the single-leg supporting state.

setting the ZMP expected value to zero in response to determining the motion state of the biped robot being a single-leg swing state or a two-legs supporting state; and determining the compensation angle of the ankle joint of the biped robot based on the ZMP position and the change rate of the ZMP position.

The step of tracking and adjusting the current angle of the ankle joint of each of the two legs of the biped robot further includes:

converting a deviation of the ZMP position and a deviation of the change rate of the ZMP position into a virtual moment of rotating the ankle joint;

performing a kinetic calculation based on the virtual moment and a rigid body rotation law to obtain the compensation angle of the ankle joint; and accumulating the compensation angle of the ankle joint to the angle of the ankle joint of each of the two legs of the biped robot in a current posture so as to smooth the ankle joint in the two-legs supporting state and the single-leg swing state.

The virtual moment is calculated (through the ankle joint smoothing controller) as:

$$\tau_{virtual}=K_p*(ZMP\_desire-ZMP)+K_d*(ZMP\_desire\_dot-ZMP\_dot);$$

where, $K_p$ and $K_d$ are parameters of the ankle joint smoothing controller;

the kinetic calculation is:

$$\tau_{virtual}=J\ddot{\theta}(t); \text{ and}$$

$$\theta(t)=\dot{\theta}_0 t+\tfrac{1}{2}\ddot{\theta}t^2;$$

where, θ is the angle that the ankle joint needs to be compensated, J is the rotational inertia of the ankle joint, and t is the time.

The ZMP expected value is calculated as:

$$ZMP\_desire=K_{p1}*(Roll\_desire-Roll\_imu)+K_{d1}*(0-Roll\_dot\_imu);$$

where, $K_{p1}$ and $K_{d1}$ are control parameters, Roll_desire is the expected rolling angle, and Roll_imu and Roll_dot_imu are respectively the rolling angle and the angular velocity fed back by an inertial detecting unit.

The step of obtaining the six-dimensional force information includes:

obtaining the six-dimensional force information of the biped robot through a six-dimensional force sensor disposed on a sole of the leg a plantar); where the motion state is a non-single, leg supporting state when a force vertical to a surface of the leg is less than a preset threshold, and the motion state is a single-leg supporting state when greater than then preset threshold.

The step of calculating the ZMP position of each of the two legs of the biped robot include:

obtaining the six-dimensional force information of the biped robot, and calculating the ZMP position of each of the two legs based on the six-dimensional force information; and performing differencing and filtering on a current ZMP position and a last ZMP position to obtain the change rate of the ZMP position.

In a second aspect, a technical solution provided by the embodiments of the present disclosure is to provide a biped robot including a body, a first leg, and a second leg, where the body is provided with at least one processor, a storage, and an inertial detecting unit coupled to the at least one processor; the first leg includes a first six-dimensional force sensor and a first joint controller both coupled to the at least one processor, and the second leg includes a second six-dimensional force sensor and a second joint controller both coupled to the at least one processor; where:

the storage stores instructions executable by the at least one processor, the at least one processor is enabled to perform the above-mentioned method when the instructions are executable by the at least one processor, such that the inertial detecting unit, the first six-dimensional force sensor, and the second six-dimensional force sensor collect data and control the first joint controller and the second joint controller to perform a posture control or an ankle joint smoothing in different motion states.

In a third aspect, a technical solution provided by the embodiments of the present disclosure is to provide a program product for a computer, where the program product includes a computer program stored on a non-transitory computer readable storage medium, the computer program includes program instructions, and the computer is caused to perform the above-mentioned method when the program instructions are executed by the computer.

The beneficial effects of the embodiments of the present disclosure are as follows. In the biped robot gait control method and the biped robot of the embodiments, the ZMP expectation of the legs are modified in real time when the body of the robot is subjected to interference and deviated, impacted by an external force, or on an uneven ground by disposing a first posture control module and a second smoothing control module on each of the two legs, the posture is controlled through ZMP tracking control, and the ankle joint is smoothed when walking, thereby ensuring the stability of walking.

BRIEF DESCRIPTION OF THE DRAWINGS

The one or more embodiments are exemplarily described by their corresponding drawings in the following drawings, and these exemplary descriptions do not constitute limitations on the embodiments. The components in the following drawings that have the same reference numeral are expressed as similar components, and the following drawings are not construed as proportional limits unless otherwise stated.

DETAILED DESCRIPTION

Figure 1:
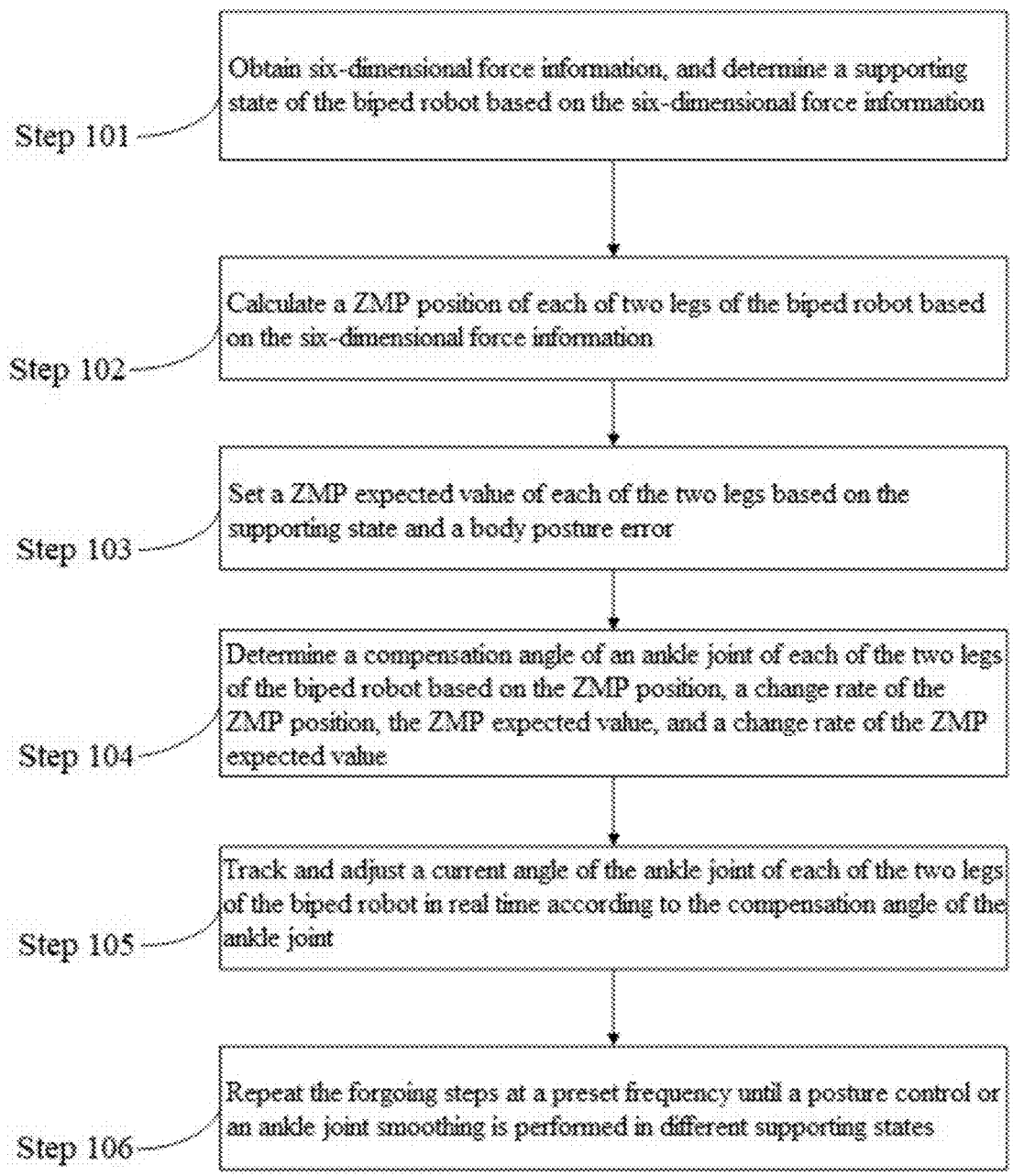
FIG. 1 is a flow chart of a biped robot gait control method according to an embodiment of the present disclosure.

In order to make the objectives, the technical solutions, and the advantages of the embodiments of the present disclosure more clearly, the embodiments of the present disclosure are further described in detail below with reference to the accompanying drawings. In which, the illustrative embodiments of the present disclosure and the description thereof are for explaining the present disclosure, but are not intended to limit the present disclosure.

The present disclosure relates to a gait control method for a biped robot, which uses the data of an inertial detecting unit 20 (see FIG. 2) for posture control of the biped robot itself, integrates the data of six-dimensional force sensors disposed on each of two legs of the biped robot, thereby performing posture correction when the biped robot is subjected to external force or is unstable when walking.

The method detects motion states it a single-leg supporting state, a two-legs supporting state, and a single-leg swing state in the walking of the biped robot through a six-dimensional force sensor disposed on a sole of a first leg 31 leg 31 and a second leg 32 of the biped robot, and obtain a contact force and a contact moment between the legs and the ground in the walking process of the biped robot.

In the present disclosure, according to the contact force and the contact moment of the sole the legs that are detected through the six-dimensional force sensors, and taking each of the ankle joints of the first leg 31 leg 31 and the second leg 32 of the robot as a reference coordinate system, the ZMP position of the first leg 31 and the second leg 32 in the X and Y directions are solved based on body posture data fed back by the inertial detecting unit 20. The inertial detecting unit 20 detects the body posture data of the biped robot in real time, and obtains the ZMP expected value of each leg based on a calculated posture deviation. The biped robot of the present disclosure is provided with an ankle joint ZMP tracking controller which obtains the body posture data of the biped robot at a preset frequency, and performs tracking and compensation on the ZMP position of the sole of the legs real-time based on the feedback data of the inertial detecting unit 20 and the six-dimensional force sensor, thereby achieving the posture control or the ankle joint smoothing in the single-leg supporting state or the two-legs supporting state as well as the single-leg swing state in a close-loop control manner.

The present disclosure realizes the close-loop control of the posture of the body 10 by tracking and compensating the ZMP position of the legs. In the one-leg supporting state, the ZMP expected value is calculated based on posture data of the body 10, and the posture of the body 10 is controlled in real time through the ZMP tracking controller, thereby ensuring the stability of the posture of the body 10. In this embodiment, in the single-leg swing state and the two-legs supporting state, the ZMP expected value is set to zero to realize step smoothing and terrain adaptation through the ZMP tracking controller, which reduces the influence of impact force when stepping and improves the stability and environmental adaptability of the walking of the biped robot.

Figure 2:
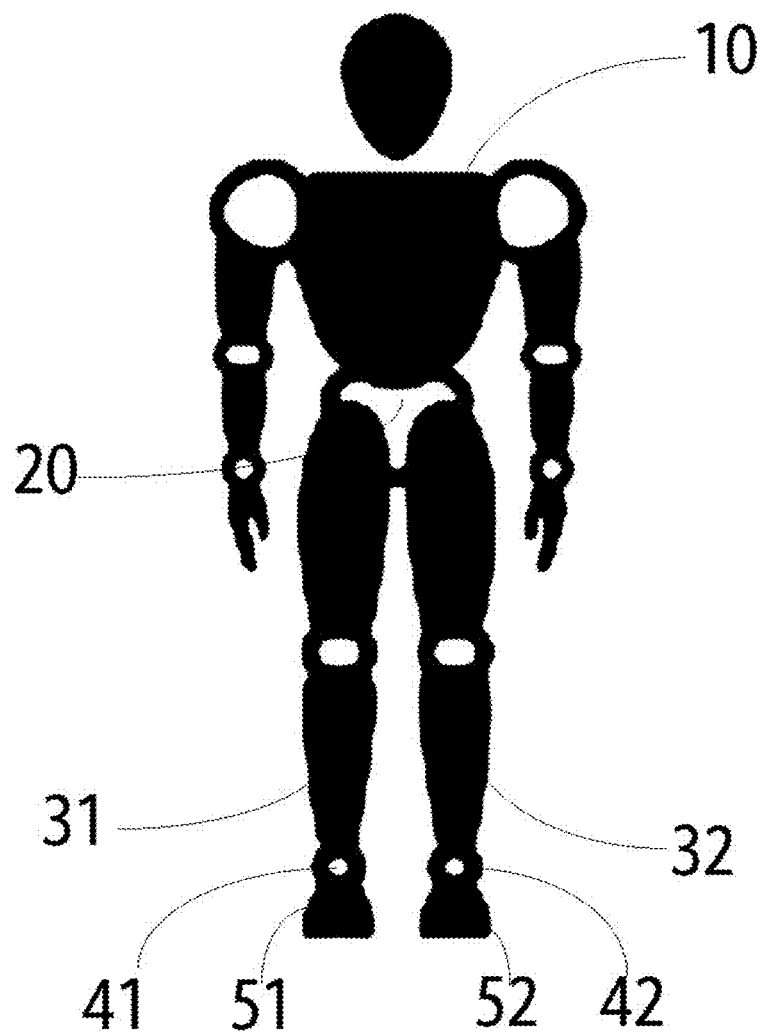
FIG. 2 is a schematic diagram of the biped robot according to an embodiment of the present disclosure.

Referring to FIG. 2, a biped robot of the present disclosure includes a body 10, a first leg 31, and a second leg 32. The body 10 is provided with at least one processor, a storage, and an inertial detecting unit 20 coupled to the at least one processor. The first leg 31 includes a first six-dimensional force sensor 51 and a first joint controller 41 both coupled to the at least one processor, and the second leg 32 includes a second six-dimensional force sensor 52 and a second joint controller 42 both coupled to the at least one processor. The inertial detecting unit 20, the first six-dimensional force sensor 51, and the second six-dimensional force sensor 52 collect data and control the first joint controller 41 and the second joint controller 42 to perform a posture control or an ankle joint smoothing in different motion states.

Figure 5:
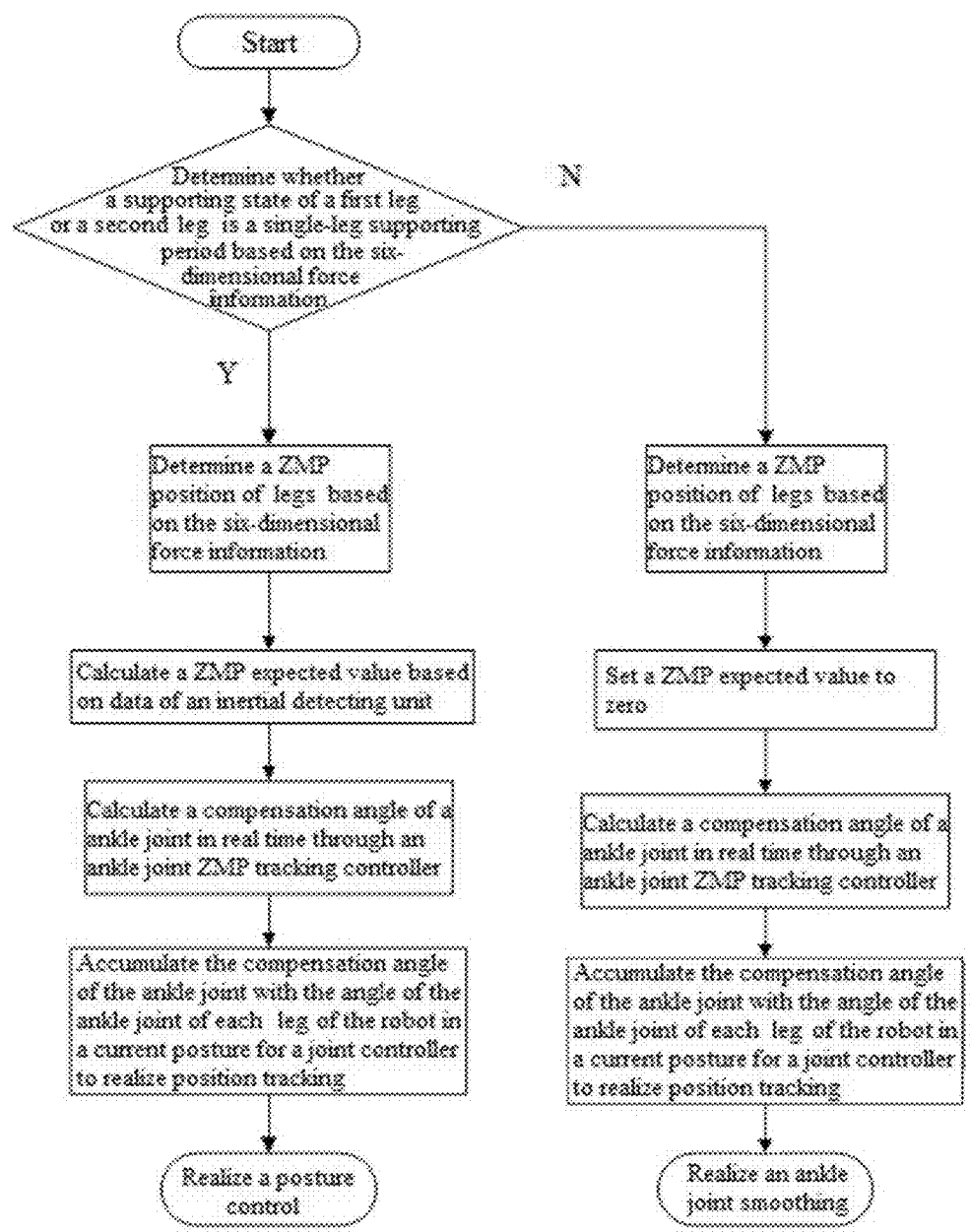
FIG. 5 is a detailed flow chart of the biped robot gait control method of FIG. 1.

Please refer to FIG. 1 and FIG. 5 together, the biped robot gait control method includes the following steps:

step 101: obtaining six-dimensional force information, and determining a motion state of two legs of the biped robot based on the six-dimensional force information, where the motion state comprises a single-leg supporting state, a single-leg swing state, and a two-legs supporting state;

step 102: determining a zero moment point (ZMP) position of each of the two legs of the biped robot in real time based on the six-dimensional force information;

step 103: setting a ZMP expected value of each of the two legs based on the motion state and body posture data of the biped robot;

step 104: obtaining a compensation angle of an ankle joint of each of the two legs of the biped robot by inputting the ZMP position, a change rate of the ZMP position, the ZMP expected value, and a change rate of the ZMP expected value to an ankle joint smoothing controller so as to perform a close-loop ZMP tracking control on each of the two legs;

step 105: adjusting a current angle of the ankle joint of each of the two legs of the biped robot in real time according to the compensation angle of the ankle joint; and step 106: repeating the forgoing steps at a preset frequency until a posture control and an ankle joint smoothing is performed in different motion states.

In which, the step 101 further includes:

obtaining the six-dimensional force information of the biped robot through a six-dimensional force sensor disposed on a sole of the leg; where the motion state is a non-single leg supporting state when a force vertical to a surface of the sole is less than a preset threshold, and the motion state is a single-leg supporting state when greater than the preset threshold.

The step 102 includes:

obtaining the six-dimensional force information of the biped robot, and calculating the ZMP position of each of the two legs based on the six-dimensional force information; and performing differencing and filtering on a current ZMP position and a last ZMP position to obtain the change rate of the ZMP position.

Figure 4:
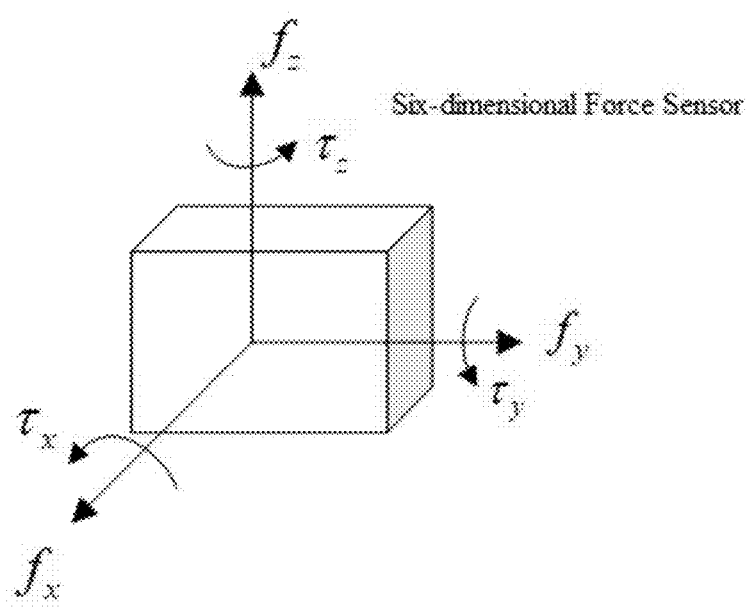
FIG. 4 is a schematic diagram of a six-dimensional force sensor according to an embodiment of the present disclosure.

Referring to FIG. 4, the six-dimensional force sensor of the biped robot is disposed on the ankle joint to detect the contact force $f=[f_x\ f_y\ f_z]^T$ and the moment $\tau=[\tau_x\ \tau_y\ \tau_z]^T$ between the legs and the ground. The definition of the coordinate system is as shown in the above-mentioned figure. The X direction is the forward direction of the robot, the Z direction is vertical, and the Y direction is determined by the right-hand system.

The calculation method of the single-leg ZMP position is as follows:

$$p_x=(\tau_y-f_x d)/f_z;\text{ and}$$

$$p_y=(\tau_x-f_y d)/f_z;$$

where, d is the height difference between the sole of the leg and the six-dimensional force sensor, $p_x$ is the ZMP position in the X direction, and $p_y$ is the ZMP position in the Y direction.

Therefore, the ZMP positions of the first leg 31 and the second leg 32 are respectively:

$$p_{Lx}=(\tau_{Ly}-f_{Lx}d)/f_{Lz}$$

$$p_{Ly}=(\tau_{Lx}-f_{Ly}d)/f_{Lz};\text{ and}$$

$$p_{Rx}=(\tau_{Ry}-f_{Rx}d)/f_{Rz}$$

$$p_{Ry}=(\tau_{Rx}-f_{Ry}d)/f_{Rz};$$

where, $f_L=[f_{Lx}\ f_{Ly}\ f_{Lz}]^T$ and $\tau_L=[\tau_{Lx}\ \tau_{Ly}\ \tau_{Lz}]^T$ are the detected data of the six-dimensional force sensor of the first leg 31, and $f_R=[f_{Rx}\ f_{Ry}\ f_{Rz}]^T$ and $\tau_R=[\tau_{Rx}\ \tau_{Ry}\ \tau_{Rz}]^T$ are the detected data of the six-dimensional force sensor of the second leg 32;

$p_{Lx}$: the ZMP position of the first leg in the X direction;
$p_{Ly}$: the ZMP position of the first leg in the Y direction;
$p_{Rx}$: the ZMP position of the second leg in the X direction;
$p_{Ry}$: the ZMP position of the second leg in the X direction;

obtaining body posture data of the biped robot detected through the inertial detecting unit 20 and determining the ZMP expected value based on the body posture information in response to determining the motion state of the biped robot being a single-leg supporting state; and determining the compensation angle of the ankle joint of each of the two legs of the biped robot based on the ZMP position, the change rate of the ZMP position, the ZMP expected value, and the change rate of the ZMP expected value.

Taking the rolling angle as an example, in the single-leg supporting state, the ZMP expected value is calculated as follows:

$$\text{ZMP\_desire}=K_{p1}*(\text{Roll\_desire}-\text{Roll\_imu})+K_{d1}*(0-\text{Roll\_dot\_imu}).$$

The step 105 further includes:

converting a deviation of the ZMP position and a deviation of the change rate of the ZMP position into a virtual moment of rotating the ankle joint;

obtaining the compensation angle of the ankle joint based on the virtual moment and a rigid body rotation law; and accumulating the compensation angle of the ankle joint to the angle of the ankle joint of each of the two legs of the biped robot in a current posture so as to control a posture of the biped robot in the single-leg supporting state.

In this embodiment, setting the ZMP expected value to zero in response to determining the notion state of the biped robot being a single-leg swing state or a two-legs supporting state; and determining the compensation angle of the ankle joint of the biped robot based on the ZMP position and the change rate of the ZMP position.

In the two-legs supporting state or the single-leg swing state:

$$ZMP\_desire = K_{p1}*(Roll\_desire - Roll\_imu) + K_{d1}*(0 - Roll\_dot\_imu);$$

taking the rolling angle as an example, in the single-leg supporting state, the ZMP expected value is set to 0, that is: ZMP_desire=0;

where, $K_{p1}$ and $K_{d1}$ are control parameters, Roll_desire is the expected rolling angle which is typically 0, and Roll_imu and Roll_dot_imu are respectively the rolling angle and the angular velocity fed back by the inertial detecting unit 20.

The step 105 further includes:

converting a deviation of the ZMP position and a deviation of the change rate of the ZMP position into a virtual moment of rotating the ankle joint;

performing a kinetic calculation based on the virtual moment and a rigid body rotation law to obtain the compensation angle of the ankle joint; and accumulating the compensation angle of the ankle joint to the angle of the ankle joint of each of the two legs of the biped robot in a current posture so as to smooth the ankle joint in a two-legs supporting state and a single-leg swing state.

The virtual moment is calculated as:

$$\tau_{virtual} = K_p*(ZMP\_desire - ZMP) + K_d*(ZMP\_desire\_dot - ZMP\_dot);$$

where, $K_p$ and $K_d$ are parameters of the ankle joint smoothing controller;

the kinetic calculation is:

$$\tau_{virtual} = J\ddot{\theta}(t); \text{ and}$$

$$\theta(t) = \dot{\theta}_0 t + \tfrac{1}{2}\ddot{\theta}t^2;$$

where, θ is the angle the ankle joint needs to be compensated, J is the moment of inertia of the ankle joint, t is the time.

In the biped robot gait control method and the biped robot of the embodiments, the ZMP expectation of the legs are modified in real time when the body 10 of the robot is subjected to interference and deviated, impacted by an external force, or on an uneven ground by disposing a first posture control module and a second smoothing control module on each of the two legs, the posture is controlled through ZMP tracking control, and the ankle joint is smoothed when walking, thereby ensuring the stability of walking.

Figure 3:
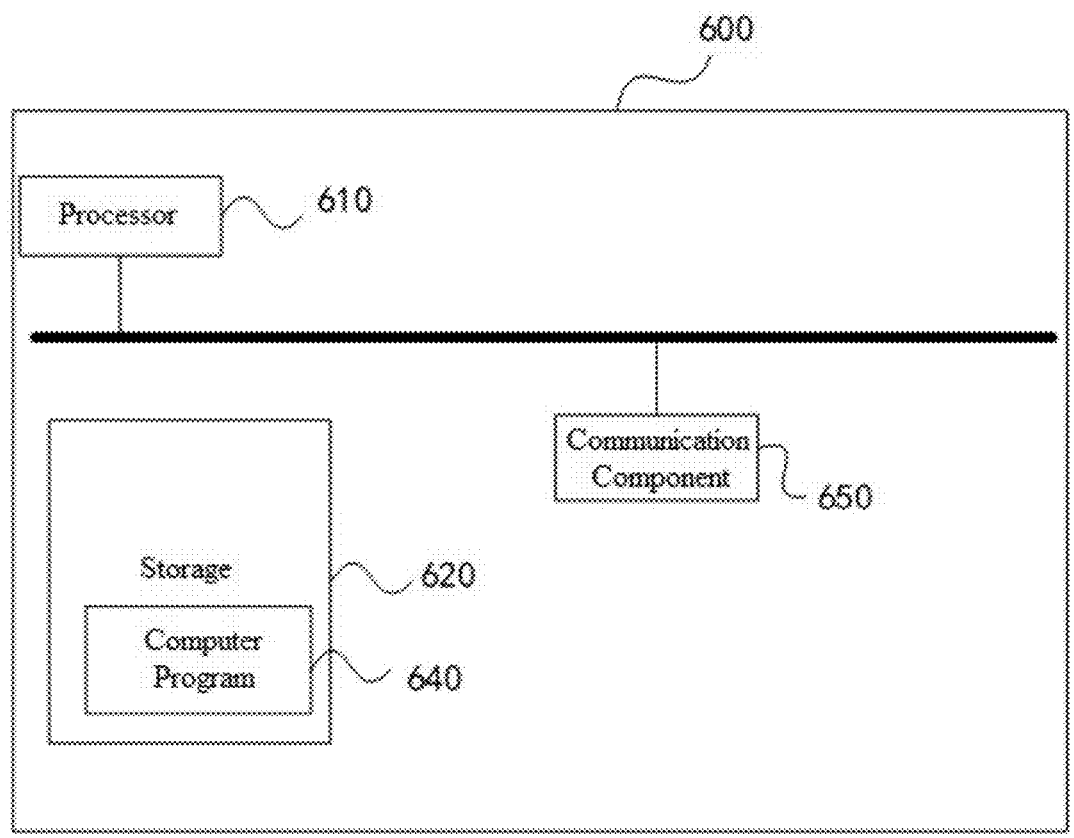
FIG. 3 is a schematic diagram of a hardware architecture for the biped robot gait control method according to an embodiment of the present disclosure.

FIG. 3 is a schematic diagram of the hardware structure of a biped robot 600 according to an embodiment of the present disclosure. As shown in FIG. 3, the robot 600 includes:

one or more processors 610, a storage 620, and a communication component 650. In FIG. 3, it is exemplified by one processor 610. The storage 620 stores instructions executable by the at least one processor 610, that is, a computer program 640. When executed by the at least one processor 610, the instructions establish a data path through the communication component 650 to enable the at least one processor 610 to execute the control method for improving the stability of the walking of the biped robot.

The processor 610, the storage 620, and the communication component 650 may be coupled through a bus or other means. In FIG. 3, it is exemplified by coupling through a bus.

The storage 620 is a non-volatile computer readable storage medium, which can be used for storing non-volatile software programs as well as non-volatile computer executable programs modules such as the program instructions/modules corresponding to the control method for improving the stability of the walking of the biped robot in this embodiment. By executing the non-volatile, software programs, instructions, and modules stored in the storage 620, the processor 610 executes various functional applications and data processing of a server, that is, realizing the control method for improving the stability of the walking of the biped robot in the above-mentioned method embodiments.

The storage 620 may include a program storage area and a data storage area, where the program storage area may store an operating system and an application required for at least one function; the data storage area may store data created in the use of the biped robot and the like. Moreover, the storage 620 may include a high speed random access memory, and may also include a non-volatile memory such as at least one magnetic disk storage device, flash memory device, or other non-volatile solid storage device. In some embodiments, storage 620 can optionally include a storage that is remotely disposed with respect to processor 610, which can be connected to the biped robot via a network. Examples of the above-mentioned network includes, but is not limited to, the Internet, an intranet, a local area network, a mobile communication network, and a combination thereof.

The one or more modules are stored in the storage 620, and execute the control method for improving the stability of the walking of the biped robot in any of the above-mentioned method embodiments when executed by the one or more processors 610, for example, execute the above-mentioned steps 101-106 in FIG. 1, and implement the functions of posture control and ankle joint smoothing.

The above-mentioned product can execute the methods provided by the embodiments of the present disclosure, and has the corresponding functional modules and beneficial effects for executing the method. For technical details that are not described in detail in this embodiment, reference may be made to the methods provided by the embodiments of the present disclosure.

Embodiments of the present disclosure provide a non-transitory computer readable storage medium which stores computer executable instructions that are executed by one or more processors so as to, for example, execute the steps 101-106 in FIG. 1 that are described above, and implement the functions of posture control and ankle joint smoothing.

Finally, it should be noted that, the above embodiments are only for illustrating the technical solutions of the present disclosure, and are not limitations thereof. Within the idea of the present disclosure, the technical features in the above embodiments or different embodiments may also be combined. The steps may be realized in any order, and there are many other variations of various aspects of the present disclosure as described above which are not provided in the details for the sake of simple and clear. Although the present disclosure has been described in detail with reference to the foregoing embodiments, those skilled in the art should understand that, the technical solutions described in each of the foregoing embodiments may be modified, or some of the technical features may be substituted in the premise of equivalence, while the modifications or substitutions will not make the essence of the corresponding technical solutions deviating from the scope of the technical solution of each of the embodiments of the present disclosure.

What is claimed is:

1. A gait control method for a biped robot, comprising the following steps:
   obtaining six-dimensional force information, and determining a motion state of two legs of the biped robot based on the six-dimensional force information, wherein the motion state comprises a single-leg supporting state, a single-leg swing state, and a two legs supporting state;
   calculating a zero moment point (ZMP) position of each of the two legs of the biped robot based on the six-dimensional force information;
   determining a ZMP expected value of each of the two legs in real time based on the motion state and body posture data of the biped robot;
   obtaining a compensation angle of an ankle joint of each of the two legs of the biped robot by inputting the ZMP position, a change rate of the ZMP position, the ZMP expected value, and a change rate of the ZMP expected value to an ankle joint smoothing controller so as to perform a close-loop ZMP tracking control on each of the two legs;
   adjusting a current angle of the ankle joint of each of the two legs of the biped robot in real time according to the compensation angle of the ankle joint; and
   repeating the forgoing steps at a preset frequency until posture control and ankle joint smoothing are performed in different motion states.

2. The gait control method for a biped robot of claim 1, further comprising the following steps:
   obtaining body posture data of the biped robot detected through an inertial detecting unit and calculating the ZMP expected value based on the body posture data in real time in response to determining the motion state of the biped robot being a single-leg supporting state; and
   determining the compensation angle of the ankle joint of each of the two legs of the biped robot based on the ZMP position, the change rate of the ZMP position, the ZMP expected value, and the change rate of the ZMP expected value.

3. The gait control method for a biped robot of claim 2, wherein:
   the step of tracking and adjusting the current angle of the ankle joint of each of the two legs of the biped robot further comprises:
   converting a deviation of the ZMP position and a deviation of the change rate of the ZMP position into a virtual moment of rotating the ankle joint;
   obtaining the compensation angle of the ankle joint based on the virtual moment and a rigid body rotation law; and
   accumulating the compensation angle of the ankle joint to the angle of the ankle joint of each of the two legs of the biped robot in a current posture so as to control a posture of the biped robot in the single-leg supporting state.

4. The gait control method for a biped robot of claim 3, wherein the virtual moment is:

$$\tau_{virtual}=K_p*(ZMP\_desire-ZMP)+K_d*(ZMP\_desire\_dot-ZMP\_dot);$$

where, $K_p$ and $K_d$ are parameters of the ankle joint smoothing controller;
the kinetic calculation is:

$$\tau_{virtual}=J\ddot{\theta}(t); \text{ and}$$

$$\theta(t)=\dot{\theta}_0 t+\frac{1}{2}\ddot{\theta}t^2;$$

where, $\theta$ is the angle the ankle joint needs to be compensated, J is the rotational inertia of the ankle joint, and t is the time.

5. The gait control method for a biped robot of claim 2, wherein the ZMP expected value is:

$$ZMP\_desire=K_{p1}*(Roll\_desire-Roll\_imu)+K_{d1}*(0-Roll\_dot\_imu);$$

where, $k_{p1}$ and $K_{d1}$ are control parameters, Roll_desire is the expected rolling angle, and Roll_imu and Roll_dot_imu are respectively the rolling angle and the angular velocity fed back by an inertial detecting unit.

6. The gait control method for a biped robot of claim 1, further comprising the following steps:
   setting the ZMP expected value to zero in response to determining the motion state of the two legs of the biped robot being a single-leg swing state or a two-legs supporting state; and
   determining the compensation angle of the ankle joint of the biped robot based on the ZMP position and the change rate of the ZMP position.

7. The gait control method for a biped robot of claim 6, wherein:
   the step of tracking and adjusting the current angle of the ankle joint of each of the two legs of the biped robot further comprises:
   converting a deviation of the ZMP position and a deviation of the change rate of the ZMP position into a virtual moment of rotating the ankle joint;
   performing a kinetic calculation based on the virtual moment and a rigid body rotation law to obtain the compensation angle of the ankle joint; and
   accumulating the compensation angle of the ankle joint to the angle of the ankle joint of each of the two legs of the biped robot in a current posture so as to smooth the ankle joint in the two-legs supporting state and the single-leg swing state.

8. The gait control method for a biped robot of claim 7, wherein the virtual moment is:

$$\tau_{virtual}=K_p*(ZMP\_desire-ZMP)+K_d*(ZMP\_desire\_dot-ZMP\_dot);$$

where, $K_p$ and $K_d$ are parameters of the ankle joint smoothing controller;
the kinetic calculation is:

$$\tau_{virtual}=J\ddot{\theta}(t); \text{ and}$$

$$\theta(t)=\dot{\theta}_0 t+\frac{1}{2}\ddot{\theta}t^2;$$

where, $\theta$ is the angle the ankle joint needs to be compensated, J is the rotational inertia of the ankle joint, and t is the time.

9. The gait control method for a biped robot of claim 1, wherein:
the step of obtaining the six-dimensional force information comprises:
obtaining the six-dimensional force information of the biped robot through a six-dimensional force sensor disposed on a sole of the leg; wherein the motion state is a non-single leg supporting state when a force vertical to a surface of the leg is less than a preset threshold, and the motion state is a single-leg supporting state when greater than then preset threshold.

10. The gait control method for a biped robot of claim 1, wherein:
the step of calculating the ZMP position of each of the two legs of the biped robot comprises:
obtaining the six-dimensional force information of the biped robot, and calculation the ZMP position of each of the two legs based on the six-dimensional force information; and
performing differencing and filtering on a current ZMP position and a last ZMP position to obtain the change rate of the ZMP position.

11. A biped robot comprising:
a body;
a first leg; and
a second leg;
wherein, the body is provided with at least one processor, a storage, and an inertial detecting unit coupled to the at least one processor; the first leg comprises a first six-dimensional force sensor and a first joint controller both coupled to the at least one processor, and the second leg comprises a second six-dimensional force sensor and a second joint controller both coupled to the at least one processor; wherein:
the storage stores one or more computer programs executable on the processor, wherein the one or more computer programs comprise:
instructions for obtaining six-dimensional force information, and determining a motion state of two legs of the biped robot based on the six-dimensional force information, wherein the motion state comprises a single-leg supporting state, a single-leg swing state, and a two-legs supporting state;
instructions for calculating a zero moment point (ZMP) position of each of the two legs of the biped robot based on the six-dimensional force information;
instructions for determining a ZMP expected value of each of the two legs in real time based on the motion state and body posture data of the biped robot;
instructions for obtaining a compensation angle of an ankle joint of each of the two legs of the biped robot by inputting the ZMP position, a change rate of the ZMP position, the ZMP expected value, and a change rate of the ZMP expected value to an ankle joint smoothing controller so as to perform a close-loop ZMP tracking control on each of the two legs;
instructions for adjusting a current angle of the ankle joint of each of the two legs of the biped robot in real time according to the compensation angle of the ankle joint; and
instructions for repeating the forgoing steps at a preset frequency until a posture control and an ankle joint smoothing is performed in different motion states.

12. The biped robot of claim 11, wherein the one or more computer programs further comprise:
instructions for obtaining body posture data of the biped robot detected through an inertial detecting unit and calculating the ZMP expected value based on the body posture data in real time in response to determining the motion state of the biped robot being a single-leg supporting state; and
instructions for determining the compensation angle of the ankle joint of each of the two legs of the biped robot based on the ZMP position, the change rate of the ZMP position, the ZMP expected value, and the change rate of the ZMP expected value.

13. The biped robot of claim 12, wherein:
the instructions for tracking and adjusting the current angle of the ankle joint of each of the two legs of the biped robot further comprise:
instructions for converting a deviation of the ZMP position and a deviation of the change rate of the ZMP position into a virtual moment of rotating the ankle joint;
instructions for obtaining the compensation angle of the ankle joint based on the virtual moment and a rigid body rotation law; and
instructions for accumulating the compensation angle of the ankle joint to the angle of the ankle joint of each of the two legs of the biped robot in a current posture so as to control a posture of the biped robot in the single-leg supporting state.

14. The biped robot of claim 13, wherein the virtual moment is:

$$\tau_{virtual}=K_p^*(\text{ZMP\_desire}-\text{ZMP})+K_d^*(\text{ZMP\_desire\_dot}-\text{ZMP\_dot});$$

where, $K_p$ and $K_d$ are parameters of the ankle joint smoothing controller;
the kinetic calculation is:

$$\tau_{virtual}=J\ddot{\theta}(t); \text{ and}$$

$$\theta(t)=\dot{\theta}_0 t+\tfrac{1}{2}\ddot{\theta}t^2;$$

where, θ is the angle the ankle joint needs to be compensated, J is the rotational inertia of the ankle joint, and t is the time.

15. The biped robot of claim 12, wherein the ZMP expected value is:

$$\text{ZMP\_desire}=K_{p1}^*(\text{Roll\_desire}-\text{Roll\_imu})+K_{d1}^*(0-\text{Roll\_dot\_imu});$$

where, $K_{p1}$ and $K_{d1}$ are control parameters, Roll_desire is the expected rolling angle, and Roll_imu and Roll_dot_imu are respectively the rolling angle and the angular velocity fed back by an inertial detecting unit.

16. The biped robot of claim 11, wherein the one or more computer programs further comprise:
instructions for setting the ZMP expected value to zero in response to determining the motion state of the two legs of the biped robot being a single-leg swing state or a two-legs supporting state; and
instructions for determining the compensation angle of the ankle joint of the biped robot based on the ZMP position and the change rate of the ZMP position.

17. The biped robot of claim 16, wherein:
the instructions for tracking and adjusting the current angle of the ankle joint of each of the two legs of the biped robot further comprise:
instructions for converting a deviation of the ZMP position and a deviation of the change rate of the ZMP position into a virtual moment of rotating the ankle joint;

instructions for performing a kinetic calculation based on the virtual moment and a rigid body rotation law to obtain the compensation angle of the ankle joint; and instructions for accumulating the compensation angle of the ankle joint to the angle of the ankle joint of each of the two legs of the biped robot in a current posture so as to smooth the ankle joint in the two-legs supporting state and the single-leg swing state.

18. The biped robot of claim 17, wherein the virtual moment is:

$$\tau_{virtual}=K_p*(ZMP\_desire-ZMP)+K_d*(ZMP\_desire\_dot-ZMP\_dot);$$

where, $K_p$ and $K_d$ are parameters of the ankle joint smoothing controller;

the kinetic calculation is:

$$\tau_{virtual}=J\ddot{\theta}(t); \text{ and}$$

$$\theta(t)=\dot{\theta}_0 t+\tfrac{1}{2}\ddot{\theta}t^2;$$

where, θ is the angle the ankle joint needs to be compensated, J is the rotational inertia of the ankle joint, and t is the time.

19. The biped robot of claim 11, wherein:

the instructions for obtaining the six-dimensional force information comprise:

instructions for obtaining the six-dimensional force information of the biped robot through a six-dimensional force sensor disposed on a sole of the leg; wherein the motion state is a non-single leg supporting state when a force vertical to a surface of the leg is less than a preset threshold, and the motion state is a single-leg supporting state when greater than then preset threshold.

20. The biped robot of claim 11, wherein:

the instructions for calculating the ZMP position of each of the two legs of the biped robot comprise:

instructions for obtaining the six-dimensional force information of the biped robot, and calculating the ZMP position of each of the two legs based on the six-dimensional force information; and instructions for performing differencing and filtering on a current ZMP position and a last ZMP position to obtain the change rate of the ZMP position.

* * * * *